US009832100B2

(12) United States Patent
Meng et al.

(10) Patent No.: US 9,832,100 B2
(45) Date of Patent: Nov. 28, 2017

(54) METHOD, DEVICE, AND COMPUTER STORAGE MEDIUM FOR IMPLEMENTING IP ADDRESS ADVERTISEMENT

(71) Applicant: ZTE Corporation, Shenzhen, Guangdong (CN)

(72) Inventors: Wei Meng, Shenzhen (CN); Yan Xiang, Shenzhen (CN)

(73) Assignee: XI'AN ZHONGXING NEW SOFTWARE CO.LTD., Xi'An (CN)

( * ) Notice: Subject to any disclaimer, the term of this patent is extended or adjusted under 35 U.S.C. 154(b) by 120 days.

(21) Appl. No.: 14/781,830

(22) PCT Filed: Apr. 3, 2014

(86) PCT No.: PCT/CN2014/074766
§ 371 (c)(1),
(2) Date: Oct. 1, 2015

(87) PCT Pub. No.: WO2014/166356
PCT Pub. Date: Oct. 16, 2014

(65) Prior Publication Data
US 2016/0043930 A1    Feb. 11, 2016

(30) Foreign Application Priority Data

Apr. 9, 2013   (CN) .......................... 2013 1 0121432

(51) Int. Cl.
*H04L 12/755*   (2013.01)
*H04L 12/751*   (2013.01)
(Continued)

(52) U.S. Cl.
CPC ............ *H04L 45/021* (2013.01); *H04L 45/02* (2013.01); *H04L 45/60* (2013.01); *H04L 47/10* (2013.01); *H04L 41/0803* (2013.01); *H04L 45/32* (2013.01)

(58) Field of Classification Search
CPC ....... H04L 45/021; H04L 47/10; H04L 45/60; H04L 45/02
See application file for complete search history.

(56) References Cited

U.S. PATENT DOCUMENTS

| 6,944,159 B1 | 9/2005 | Fotedar |
| 7,839,869 B1 | 11/2010 | Fotedar |

(Continued)

FOREIGN PATENT DOCUMENTS

| CN | 1350387 A | 5/2002 |
| CN | 101155135 A | 4/2008 |

(Continued)

OTHER PUBLICATIONS

English Translation of the Written Opinion of the International Search Authority in international application No. PCT/CN2014/074766, dated Jun. 24, 2014. 6 pgs.

(Continued)

*Primary Examiner* — Jackie Zuniga Abad
(74) *Attorney, Agent, or Firm* — Cooper Legal Group, LLC

(57) ABSTRACT

Disclosed are a method, device, and computer storage medium for implementing IP address advertisement. An advertisement for controlling LSA11 and an advertisement control switch for flooding are added into a router. The router performs, according to a state indicated by the advertisement control switch, IP address advertisement or flooding for LSA11 encapsulated with an IP address.

5 Claims, 3 Drawing Sheets

(51) Int. Cl.
*H04L 12/773* (2013.01)
*H04L 12/801* (2013.01)
H04L 12/721 (2013.01)
H04L 12/24 (2006.01)

(56) References Cited

U.S. PATENT DOCUMENTS

2006/0133298 A1 6/2006 Ng
2013/0077476 A1 3/2013 Enyedi et al.

FOREIGN PATENT DOCUMENTS

CN 102457407 A 5/2012
EP 1202506 A1 5/2002

OTHER PUBLICATIONS

Supplementary European Search Report in European application No. 14783356.0, dated Mar. 16, 2016, 7 pgs.
Berger Labn I Bryskin Adva A Zinin Alcatel-Lucent R Coltun Acoustra Productions L: "The OSPF Opaque LSA Option; rfc5250. txt", [Online] Jul. 1, 2008 (Jul. 1, 2008), XP015057223, Retrieved from the Internet: URL: https://tools.ietf.org/pdf/rfc5250.pdf > [retrieved on Mar. 10, 2016] * the whole document *, mailed on Jul. 1, 2008, 18 pgs.
International Search Report in international application No. PCT/CN2014/074766, dated Jun. 24, 2014, 2 pgs.

Fig.3
| Value | Opaque Type | Association standard |
|---|---|---|
| 1 | Traffic Engineering LSA | [RFC3630] |
| 2 | Sycamore Optical Topology Descriptions | [Moy] |
| 3 | Grace-LSA | [RFC3623] |
| 4 | Router Information | [RFC4970] |
| 5 | IP address Information | disclosed herein first |
| 6-127 | unused | |
Fig.4
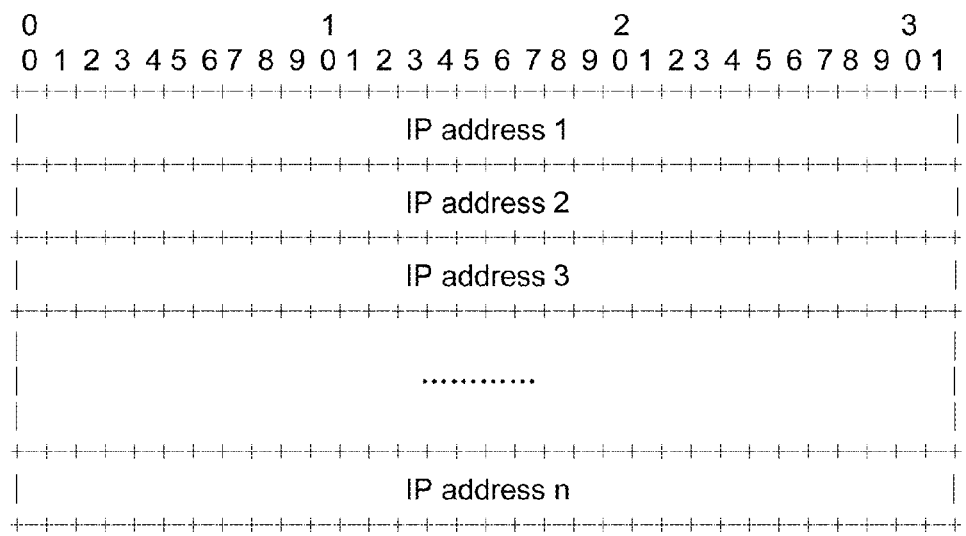
Fig.5
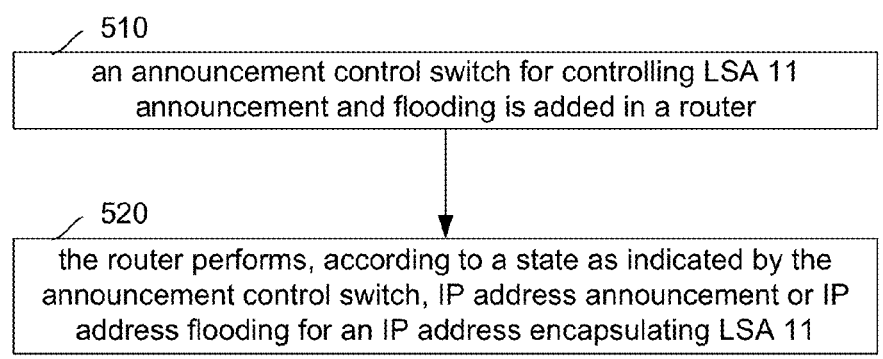

METHOD, DEVICE, AND COMPUTER STORAGE MEDIUM FOR IMPLEMENTING IP ADDRESS ADVERTISEMENT

TECHNICAL FIELD

The disclosure relates to the field of communication, and specifically to a method, device, and non-transitory computer-readable storage medium for implementing IP address announcement or advertisement.

BACKGROUND

An Open Shortest Path First (OSPF) protocol is an Interior Gateway Protocol (IGP) for making a routing decision within a single Autonomous System (AS).

A Link-State Advertisement (LSA) is a packet used in a link-state protocol, which includes information on a neighbor and a passage cost. A router uses an LSA for maintaining a route option table. There are eleven types of LSAs in the OSPF, listed as follows.

An LSA 1 is a Router LSA.
An LSA 2 is a network LSA.
An LSA 3 is a Network summary LSA.
An LSA 4 is an AS Border Router (ASBR) summary LSA.
An LSA 5 is an AS external LSA.
An LSA 6 is a Group membership LSA.
An LSA 7 is a Not-So-Stubby Area specific AS external LSA (NSSA External LSA).
An LSA 8 is an external attributes LSA for a Border Gateway Protocol (External attributes LSA for BGP).
An LSA 9 is a link-scoped Opaque LSA.
An LSA 10 is an area-scoped Opaque LSA.
An LSA 11 is an AS-scoped Opaque LSA.

With the existing OSPF protocol, there are four LSAs capable of announcing a 32-bit IP address, i.e., LSA 1, LSA 3, LSA 5, and LSA 7; with both LSA 5 and LSA 7 being AS external LSAs. A 32-bit IP address may be announced as follows with such an LSA.

(1) A 32-bit IP address may be announced with LSA 1 by configuring an interface as a Point-to-Multipoint (PTMP) interface with a 32-bit IP address.

(2) A 32-bit IP address may be announced with LSA 3 by transforming LSA 1 in form of LSA 3 in another area, corresponding to 32-bit routing.

(3) No 32-bit IP address may be announced with LSA 5, LSA 7 in existing art.

In a practical application, 32-bit IP address announcement with LSA 1 may be implemented only with a loopback interface, with the requirement of configuring any interface as a PTMP interface, which is impractical. In 32-bit IP address announcement with LSA 3, as LSA 3 is transformed from LSA 1, accurate correspondence between an address and a node is unavailable to another node.

SUMMARY

In view of this, an embodiment herein provides a method, device, and non-transitory computer-readable storage medium for implementing IP address announcement or advertisement.

An embodiment herein provides a method for implementing IP address announcement, including: adding, in a router, an announcement control switch for controlling Link-State Advertisement LSA 11 announcement and flooding; and performing, by the router according to a state as indicated by the announcement control switch, IP address announcement or IP address flooding for an IP address encapsulating LSA 11.

The announcement control switch may be called OSPF address {announce|forward}, with the Open Shortest Path First OSPF address announce for controlling 32-bit IP address announcement and the OSPF address forward for controlling 32-bit IP address flooding.

The performing, by the router according to a state as indicated by the announcement control switch, IP address announcement or IP address flooding for an IP address encapsulating LSA 11 may include:

when the announcement control switch is in an OSPF address announce state, performing, by the router, IP address announcement; and/or when the announcement control switch is in an OSPF address forward state, performing, by the router, IP address flooding.

The performing, by the router, IP address announcement may include: packing, by the router, a to-be-announced 32-bit IP address in the LSA 11, and sending the LSA 11 with the to-be-announced 32-bit IP address to a neighboring router.

The performing, by the router, IP address flooding may include: flooding, by the router, a received LSA 11 to a neighboring router.

The method may include: before performing the IP address announcement, determining, by the router, whether a neighboring router has Opaque capability, whether the router has Opaque capability, and whether the announcement control switch set at the router is in an announce state; and confirming that the neighboring router has Opaque capability, the router has Opaque capability, and the announcement control switch set at the router is in the announce state.

The method may include: before performing the IP address flooding, determining, by the router, whether the router has Opaque capability and whether the announcement control switch set at the router is in a forward state; and confirming that the router has Opaque capability and the announcement control switch set at the router is in the forward state.

An embodiment herein further provides a device for implementing IP address announcement. The device may be a router. The device may include an announcement control switch module and an announcing module.

The announcement control switch module may be configured for controlling Link-State Advertisement LSA 11 announcement and flooding.

The announcing module may be configured for performing, according to a state as indicated by the announcement control switch module, IP address announcement or IP address flooding for an IP address encapsulating LSA 11.

The announcement control switch module may be called OSPF address {announce|forward}. The Open Shortest Path First OSPF address announce is for controlling 32-bit IP address announcement. The OSPF address forward is for controlling 32-bit IP address flooding.

The announcing module may be configured for: when the announcement control switch module is in an OSPF address announce state, performing IP address announcement. The announcing module may be configured for: when the announcement control switch module is in an OSPF address forward state, performing IP address flooding.

The IP address announcement may be performed by: packing a to-be-announced 32-bit IP address in the LSA 11, and sending the LSA 11 with the to-be-announced 32-bit IP address to a neighboring router.

The IP address flooding may be performed by: flooding a received LSA 11 to a neighboring router.

The announcing module may include an IP address announcing unit and/or an IP address flooding unit.

The IP address announcing unit may be configured for performing the IP address announcement.

The IP address flooding unit may be configured for performing the IP address flooding.

The IP address announcing unit may be configured for: before performing the IP address announcement, determining whether a neighboring router has Opaque capability, whether the router has Opaque capability, and whether the announcement control switch module is in an announce state; and confirming that the neighboring router has Opaque capability, the router has Opaque capability, and the announcement control switch module is in the announce state.

The IP address flooding unit may be configured for: before performing the IP address flooding, determining whether the router has Opaque capability and whether the announcement control switch module is in a forward state, and confirming that the router has Opaque capability and the announcement control switch module is in the forward state.

An embodiment herein further provides a non-transitory computer-readable storage medium, including computer-executable instructions which, when executed on at least one processor, cause the at least one processor to carry out the method.

In IP address announcement implemented herein, 32-bit IP address announcement may be performed with any type of interface; an IP address may originate from an interface IP address of the router or from an IP address in an address pool configured for the router. With the disclosure, an inter-router interface does not have to be configured as a PTMP interface in order to announce an IP address, and an IP address other than a loopback interface IP address of the router may be announced as well.

BRIEF DESCRIPTION OF THE DRAWINGS

FIG. 3 is a schematic diagram of an Opaque type field according to an embodiment herein.

FIG. 4 is a schematic diagram of an Opaque information field according to an embodiment herein.

FIG. 5 is a flowchart of implementing IP address announcement according to an embodiment herein.

DETAILED DESCRIPTION

Figure 1:
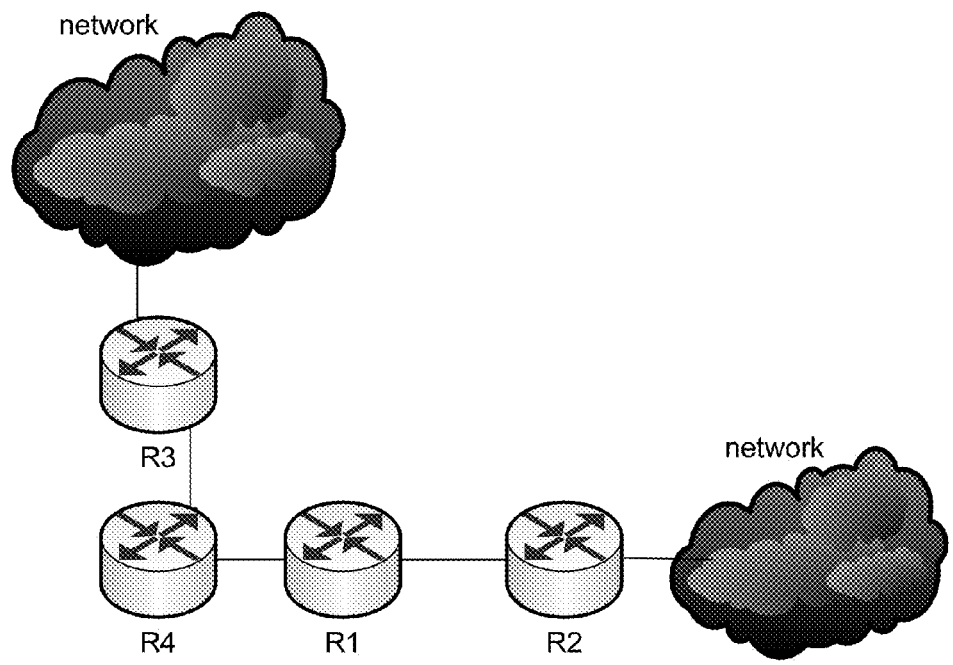
FIG. 1 is a diagram of a network topology for implementing IP address announcement according to an embodiment herein.

According to embodiments herein, 32-bit IP address announcement may be implemented by expanding an AS-scoped Opaque LSA (namely LSA 11) in the OSPF protocol. A basic framework of an LSA 11 already exists, with a flooding scope being an entire OSPF domain.

An LSA 11 can carry OSPF or non-routing information of another service for a specific service application and a related scene. An AS-scoped Opaque LSA is produced under control of Opaque capability (flooding suppression capability) of a source router. When the source router has no Opaque capability, no LSA 11 will be produced, thus no corresponding data announcement. Therefore, scope-controllable 32-bit IP address announcement may be implemented by carrying to-be-announced address information (such as 32-bit IP address information) in the LSA 11.

AS-scoped Opaque LSA flooding is controlled by Opaque capability of a neighboring router. When a neighboring router has no Opaque capability, in message exchange during link establishment, a source router will learn that the neighboring router has no Opaque capability, and thus will not flood AS-scoped Opaque LSA corresponding data to the neighboring router.

Opaque capability of a router is controlled by an enabling switch set in the router. The enabling switch may enable or disable Opaque capability. An existing Opaque capability enabling switch may in general control to produce and flood three types of LSAs, namely LSA 9, LSA 10, and LSA 11.

In a practical application, an announcement control switch may further be added in a router to specifically control to announce and flood an AS-scoped Opaque LSA. The announcement control switch may be called OSPF address {announce|forward}. The OSPF IP address announce is for controlling 32-bit IP address announcement. The OSPF IP address forward is for controlling 32-bit IP address flooding. In general, when the announcement control switch is in an OSPF address announce state, 32-bit IP address announcement may be performed. When the announcement control switch is in an OSPF address forward state, 32-bit IP address flooding may be performed.

A router with such setting may serve as a source router. Once started and connected to a network, the source router may discover a neighbor through an OSPF link establishing (hello) message, and hereby determine whether Opaque capability is enabled at a neighboring router. When a neighboring router enables no Opaque capability (namely the neighboring router has no Opaque capability), the source router performs no AS-scoped Opaque LSA announcement. When Opaque capability is enabled at a neighboring router (namely the neighboring router has Opaque capability), the source router may determine whether the source router has Opaque capability and whether the announcement control switch set at the source router is in an announce state; when the source router has Opaque capability and the announcement control switch is in the announce state, the source router may pack a to-be-announced 32-bit IP address in an AS-scoped Opaque LSA, and send the AS-scoped Opaque LSA to the neighboring router.

Figure 2:
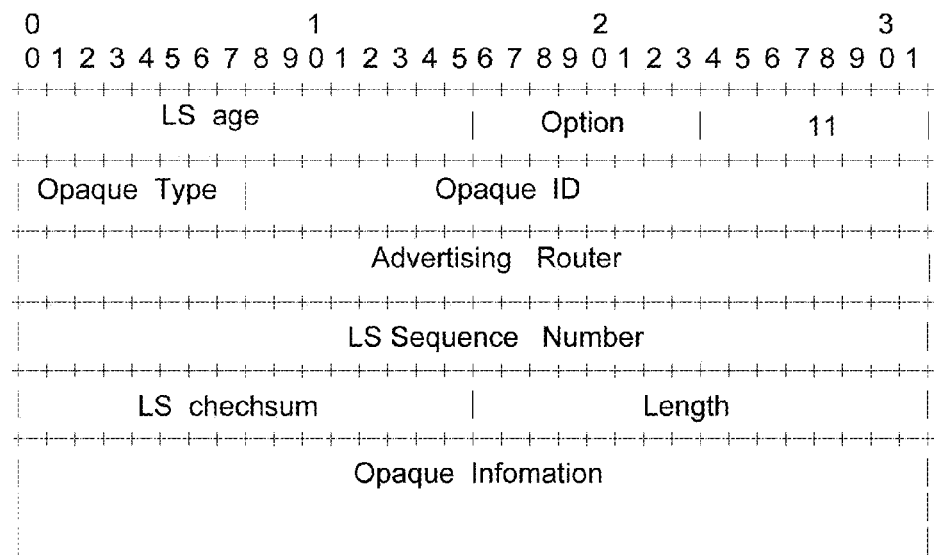
FIG. 2 is a schematic diagram of a message structure for implementing IP address announcement according to an embodiment herein.

A specific structure of an AS-scoped Opaque LSA is as shown in FIG. 2 to FIG. 4. In FIG. 2, an Opaque Type field is filled with an Opaque Type value as shown in FIG. 3, in which 5 is a new Opaque Type value according to an embodiment herein. An Opaque Information field is filled with an IP address as shown in FIG. 4. The IP address serves as a message encapsulation format of the Opaque Information.

When the router serves as an object router, after receiving an AS-scoped Opaque LSA with a message structure as shown in FIG. 2-FIG. 4, the object router may determine whether the object router has Opaque capability. When the object router has no Opaque capability, the received AS-scoped Opaque LSA is discarded.

When the object router has Opaque capability, the object router may load a 32-bit IP address in the received AS-scoped Opaque LSA. Then, the object router may determine whether the announcement control switch set at the object router is in a forward state. When said switch is in the forward state, the object router may flood the received AS-scoped Opaque LSA to a neighboring router. When it is not in the forward state, no flooding is performed.

It may be seen that 32-bit IP address announcement may be implemented by setting the control switch and by AS-scoped Opaque LSA sending, receiving and flooding by the router.

For example, referring to FIG. 1, assume that there are four routers R1, R2, R3, and R4, respectively with settings as follows.

R1 is configured for supporting Opaque capability and being in an OSPF address announce state.

R2 is configured for supporting no Opaque capability.

R3 is configured for supporting Opaque capability.

R4 is configured for supporting Opaque capability and being an OSPF address forward state.

First, R1, R2, R3, and R4 may establish a neighboring relation according to the network topology.

R1 may encapsulate a to-be-announced 32-bit IP address (such as any IP address configured locally) in a data area of an AS-scoped Opaque LSA.

R1 may discover that R4 supports Opaque capability, and R2 supports no Opaque capability. Thus R1 may flood, through an OSPF protocol message, the AS-scoped Opaque LSA to R4, instead of to R2.

After receiving the AS-scoped Opaque LSA flooded by R1, R4 may determine that R4 per se has Opaque capability, and thus load, in an application module of R4, a 32-bit IP address encapsulated in the data area of the AS-scoped Opaque LSA by R1.

R4 may determine that R4 per se is in an OSPF address forward state, and learn that the neighboring R3 has Opaque capability. Thus R4 may flood the AS-scoped Opaque LSA to R3.

After receiving the AS-scoped Opaque LSA flooded by R4, R3 may determine that R3 per se has Opaque capability, and thus load, in an application module of R3, a 32-bit IP address encapsulated in the data area of the AS-scoped Opaque LSA.

R3 may determine that R3 per se is not in an OSPF address forward state, and thus perform no further flooding of the AS-scoped Opaque LSA flooded by R4.

Thus, R3 and R4 obtain any 32-bit IP address configured on R1.

Note that specific data of the announcement control switch may be recorded in an entry such as a parameter configuration table, such that it may be learned whether the announcement control switch of the router is currently in the announce state or the forward state by looking up a corresponding entry. Aforementioned content is based on an exemplary 32-bit IP address. In fact, what disclosed may also apply to an IP address other than that of 32 bits analogically.

It may be seen that IP address announcement according to an embodiment herein may be implemented by a flow as shown in FIG. 5. The flow may include steps as follows.

In step 510, an announcement control switch for controlling LSA 11 announcement and flooding is added in a router.

In step 520, the router performs, according to a state as indicated by the announcement control switch, IP address announcement or IP address flooding for an IP address encapsulating LSA 11.

Figure 6:
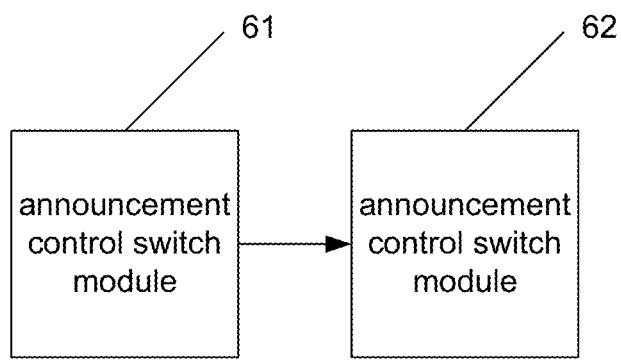
FIG. 6 is a schematic diagram of a structure of a device for implementing IP address announcement according to an embodiment herein.

It may be seen that a device for implementing IP address announcement according to an embodiment herein may be located in a router. As shown in FIG. 6, the device may include an announcement control switch module 61 and an announcing module 62.

The announcement control switch module 61 may be configured for controlling LSA 11 announcement and flooding.

The announcing module 62 may be configured for performing, according to a state as indicated by the announcement control switch module 61, IP address announcement or IP address flooding for an IP address encapsulating LSA 11.

The announcement control switch module 61 may be called OSPF address {announce|forward}. The OSPF address announce is for controlling 32-bit IP address announcement. The OSPF address forward is for controlling 32-bit IP address flooding.

The announcing module 62 may be configured for: when the announcement control switch module 61 is in an OSPF address announce state, performing IP address announcement; and/or when the announcement control switch module 61 is in an OSPF address forward state, performing IP address flooding.

The announcing module may include an IP address announcing unit and/or an IP address flooding unit.

The IP address announcing unit may be configured for performing the IP address announcement.

the IP address flooding unit may be configured for performing the IP address flooding.

The IP address announcing unit may be further configured for: before performing the IP address announcement, determining whether a neighboring router has Opaque capability, whether the local router has Opaque capability, and whether the local announcement control switch module 61 is in an announce state; and confirming that the neighboring router has Opaque capability, the local router has Opaque capability, and the local announcement control switch module 61 is in the announce state.

The IP address flooding unit may be further configured for: before performing the IP address flooding, determining whether the local router has Opaque capability and whether the local announcement control switch module 61 is in a forward state, and confirming that the local router has Opaque capability and the local announcement control switch module 61 is in the forward state.

In practical application, the announcement control switch module 61 may be implemented by a control switch or an analog switch in the device for implementing IP address announcement; the announcing module 62 may be implemented by a Central Processing Unit (CPU), a Digital Signal Processor (DSP), or a Field-Programmable Gate Array (FPGA) in the device for implementing IP address announcement in combination with a transceiver; a determining module may be implemented by the CPU, the DSP, or the FPGA in the device for implementing IP address announcement.

To sum up, it may be seen that in IP address announcement implemented with the method or the device herein, 32-bit IP address announcement may be performed with any type of interface; an IP address may originate from an interface IP address of the router or from an IP address in an address pool configured for the router. With the disclosure, an inter-router interface does not have to be configured as a PTMP interface in order to announce an IP address, and an IP address other than a loopback interface IP address of the router may be announced as well.

Those skilled in the art should understand that the embodiments described herein may be embodied as a method, system or computer-program product. Therefore, the disclosure may be implemented in form of a hardware embodiment, a software embodiment, or an embodiment of a software-hardware combination. Moreover, the disclosure may be in the form of a computer-program product implemented on one or more computer-usable storage media (including, but not limited to a disk memory or an optical memory) containing computer-usable codes.

The disclosure is illustrated with reference to flowcharts and/or block diagrams of the method, device (system) and computer-program product according to embodiments described herein. Note that each flow in the flowcharts and/or each block in the block diagrams as well as combination of flows in the flowcharts and/or blocks in the block diagrams may be implemented by instructions of a computer program. Such instructions may be offered in a processor of a general-purpose computer, a dedicated computer, an embedded processor or other programmable data processing devices to generate a machine, such that a device with a function specified in one or more flows of the flowcharts and/or one or more blocks in the block diagrams is produced by instructions executed by a processor of a computer or other programmable data processing devices.

These computer-program instructions may also be stored in a non-transitory computer-readable memory capable of guiding a computer or another programmable data processing device to work in a given way, such that the instructions stored in the computer-readable memory generate a manufactured good including an instruction device for implementing a function specified in one or more flows of the flowcharts and/or one or more blocks in the block diagrams.

These computer-program instructions may also be loaded in a computer or other programmable data processing devices, which thus executes a series of operations thereon to generate computer-implemented processing, such that the instructions executed on the computer or other programmable data processing devices provide the steps for implementing the function specified in one or more flows of the flowcharts or one or more blocks in the block diagrams.

What described are merely embodiments of the present disclosure and are not intended to limit the scope of the present disclosure.

The invention claimed is:

1. A method for implementing IP address announcement, comprising:
   adding, in a router, an announcement control switch for controlling Link-State Advertisement LSA 11 announcement and flooding;
   configuring a state of the announcement control switch, the state being an announce state or a forward state;
   recording data on the state of the announcement control switch in a parameter configuration table;
   learning the state of the announcement control switch by looking up the parameter configuration table; and
   performing, by the router according to the state of the announcement control switch, IP address announcement or IP address flooding for an LSA 11 comprising an IP address,
   wherein the router discovers a neighbor through an Open Shortest Path First (OSPF) link establishing message, and determines whether Opaque capability is enabled at a neighboring router; the router performs no LSA 11 announcement nor LSA 11 flooding to the neighboring router when the neighboring router enables no Opaque capability;
   otherwise when Opaque capability is enabled at the neighboring router,
   when the router serves as a source router, the router determines whether the router has Opaque capability and whether the announcement control switch set at the router is in the announce state; when the router has Opaque capability and the announcement control switch is in the announce state, the router packs a to-be-announced IP address in an LSA 11, and sends the LSA 11 to the neighboring router, wherein an Opaque Type field of the LSA 11 is filled with an Opaque Type value 5 indicating IP address information,
   and when the router serves as an object router, after receiving an LSA 11 comprising an IP address, the router determines whether the router has Opaque capability; when the router has no Opaque capability, the router discards the received LSA 11; when the router has Opaque capability, the router loads the IP address in the received LSA 11, and determines whether the announcement control switch set at the router is in the forward state; when the announcement control switch is in the forward state, the router floods the received LSA 11 to the neighboring router; when the announcement control switch is not in the forward state, the router performs no flooding.

2. The method according to claim 1, wherein the announcement control switch is called OSPF address {announce|forward}, with the OSPF address announce for controlling IP address announcement and the OSPF address forward for controlling IP address flooding.

3. A device for implementing IP address announcement, the device being a router; the device comprising:
   a processor; and
   a computer storage medium storing an instruction executable by the processor,
   wherein the processor is configured for:
   adding an announcement control switch for controlling Link-State Advertisement LSA 11 announcement and flooding;
   configuring a state of the announcement control switch, the state being an announce state or a forward state;
   recording data on the state of the announcement control switch in a parameter configuration table;
   learning the state of the announcement control switch by looking up the parameter configuration table; and
   performing, according to the state of the announcement control switch, IP address announcement or IP address flooding for an LSA 11 comprising an IP address,
   wherein the router discovers a neighbor through an Open Shortest Path First (OSPF) link establishing message, and determines whether Opaque capability is enabled at a neighboring router; the router performs no LSA 11 announcement nor LSA 11 flooding to the neighboring router when the neighboring router enables no Opaque capability;
   otherwise when Opaque capability is enabled at the neighboring router,
   when the router serves as a source router, the router determines whether the router has Opaque capability and whether the announcement control switch set at the router is in the announce state; when the router has Opaque capability and the announcement control switch is in the announce state, the router packs a to-be-announced IP address in an LSA 11, and sends the LSA 11 to the neighboring router, wherein an Opaque Type field of the LSA 11 is filled with an Opaque Type value 5 indicating IP address information, and when the router serves as an object router, after receiving an LSA 11 comprising an IP address, the router determines whether the router has Opaque capability; when the router has no Opaque capability, the router discards the received LSA 11; when the router has Opaque capability, the router loads the IP address in the received LSA 11, and determines whether the announcement control switch set at the router is in the forward state; when the announcement control switch is in the forward state, the router floods the received LSA 11 to the neighboring router; when the announcement control switch is not in the forward state, the router performs no flooding.

4. The device according to claim 3, wherein the announcement control switch is called OSPF address {announce|forward}, with the OSPF address announce for controlling IP address announcement and the OSPF address forward for controlling IP address flooding.

5. A non-transitory computer-readable storage medium, comprising computer-executable instructions which, when executed on at least one processor, cause the at least one processor to carry out a method for implementing IP address announcement, the method comprising:
- adding, in a router, an announcement control switch for controlling Link-State Advertisement LSA 11 announcement and flooding;
- configuring a state of the announcement control switch, the state being an announce state or a forward state;
- recording data on the state of the announcement control switch in a parameter configuration table;
- learning the state of the announcement control switch by looking up the parameter configuration table; and
- performing, by the router according to the state of the announcement control switch, IP address announcement or IP address flooding for an LSA 11 comprising an IP address, wherein the method further comprises:
- discovering, by the router, a neighbor through an Open Shortest Path First (OSPF) link establishing message, and determining whether Opaque capability is enabled at a neighboring router; performing no LSA 11 announcement nor LSA 11 flooding to the neighboring router when the neighboring router enables no Opaque capability;
- otherwise when Opaque capability is enabled at the neighboring router,
    - when the router serves as a source router, determining, by the router, whether the router has Opaque capability and whether the announcement control switch set at the router is in the announce state; when the router has Opaque capability and the announcement control switch is in the announce state, packing a to-be-announced IP address in an LSA 11, and sending the LSA 11 to the neighboring router, wherein an Opaque Type field of the LSA 11 is filled with an Opaque Type value 5 indicating IP address information,
    - and when the router serves as an object router, after receiving an LSA 11 comprising an IP address, determining, by the router, whether the router has Opaque capability; when the router has no Opaque capability, discarding the received LSA 11; when the router has Opaque capability, loading the IP address in the received LSA 11, and determining whether the announcement control switch set at the router is in the forward state; when the announcement control switch is in the forward state, flooding the received LSA 11 to the neighboring router; when the announcement control switch is not in the forward state, the router performing no flooding.

\* \* \* \* \*